US010169193B2

(12) United States Patent
Guan et al.

(10) Patent No.: US 10,169,193 B2
(45) Date of Patent: Jan. 1, 2019

(54) COMMON DEBUG SCRIPTING FRAMEWORK FOR DRIVING HYBRID APPLICATIONS CONSISTING OF COMPILED LANGUAGES AND INTERPRETED LANGUAGES

(71) Applicant: International Business Machines Corporation, Armonk, NY (US)

(72) Inventors: Yingcong Guan, Richmond Hill (CA); John R. MacMillan, Toronto (CA); Ettore Tiotto, Markham (CA); Trong Truong, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/376,999

(22) Filed: Dec. 13, 2016

(65) Prior Publication Data
US 2018/0165175 A1 Jun. 14, 2018

(51) Int. Cl.
*G06F 11/36* (2006.01)
(52) U.S. Cl.
CPC ........ *G06F 11/362* (2013.01); *G06F 11/3664* (2013.01)
(58) Field of Classification Search
None
See application file for complete search history.

(56) References Cited

U.S. PATENT DOCUMENTS

| 6,353,923 | B1 | 3/2002 | Bogle et al. |
| 7,203,926 | B2 | 4/2007 | Bogle et al. |
| 8,719,791 | B1 * | 5/2014 | MacPherson ......... G06F 9/4426 717/104 |
| 2001/0005852 | A1 * | 6/2001 | Bogle ................. G06F 9/45512 718/102 |
| 2003/0204838 | A1 | 10/2003 | Caspole et al. |

(Continued)

OTHER PUBLICATIONS

Hausmann, Chritoph, et al; "Debugging Cross-Platform Mobile Apps Without Tool Break"; Software Engineering; 2013; 377-390 pages.

(Continued)

*Primary Examiner* — Philip Wang
(74) *Attorney, Agent, or Firm* — Cantor Colburn LLP; William A. Kinnaman, Jr.

(57) ABSTRACT

Aspects of the present invention include a method which includes a processor providing a debug extension library; providing a common debug interface and at least two common debug interface implementations, a first one of the common debug interface implementations being dedicated to a native debugger of an interpreted language computer program, a second one of the common debug interface implementations being dedicated to a native debugger of a compiled language computer program, wherein an application contains a first portion written in an interpreted programming language and a second portion written in a compiled programming language; and responding to a user command provided through a debug script program to debug the application by commanding one of the native debugger of an interpreted language computer program or the native debugger of a compiled language computer program through the corresponding dedicated common debug interface implementation.

11 Claims, 7 Drawing Sheets

(56) References Cited

U.S. PATENT DOCUMENTS

| | | | | |
|---|---|---|---|---|
| 2004/0230955 A1* | 11/2004 | Pugh | ............... | G06F 9/4448 |
| | | | | 717/124 |
| 2006/0064677 A1* | 3/2006 | Bickson | ............ | G06F 11/3664 |
| | | | | 717/124 |
| 2008/0263522 A1* | 10/2008 | Fung | ............... | G06F 11/3632 |
| | | | | 717/125 |
| 2011/0154301 A1* | 6/2011 | Klinker | ............ | G06F 11/362 |
| | | | | 717/135 |
| 2012/0331351 A1* | 12/2012 | Davis | ............ | G06F 11/3664 |
| | | | | 714/38.1 |
| 2014/0366007 A1 | 12/2014 | Koltachev et al. | | |

OTHER PUBLICATIONS

Lee, Byeongcheol, et al; "Debugging Mixed-Environment Programs with Blink"; Software—Practice and Experience (2014); 1-30.

Wozniak, Justin, M., et al; "Toward Interlanguage Parallel Scripting for Distributed-Memory Scientific Computing"; IEEE International Conference on Cluster Computing; (2015); 482-485 pages.

* cited by examiner

COMMON DEBUG SCRIPTING FRAMEWORK FOR DRIVING HYBRID APPLICATIONS CONSISTING OF COMPILED LANGUAGES AND INTERPRETED LANGUAGES

BACKGROUND

The present invention relates to software or computer programs, and more specifically, to methods, systems and computer program products that provide a common debug scripting framework for driving hybrid software or computer program applications each comprising one or more compiled language computer program components and one or more interpreted language computer program components.

In modern software or computer programs (otherwise known and referred to herein as "applications"), it is common to have a single application that is written in different programming languages. Also, these different programming languages may comprise different types of languages, such as compiled languages (e.g., C, C++, COBOL, etc.) and interpreted languages (e.g., Java). Thus, it is increasingly common nowadays to have an application that is "hybrid" in nature in that it is comprised of one or more compiled computer program or programming language components and one or more interpreted computer program or programming language components. This may be done for various reasons, including, for example, to save application development time by utilizing existing, proven functionality contained in legacy code written in one type of language (e.g., libraries, subroutines, modules, etc. written in an older compiled language such as COBOL) together with original, newly-written code that is written in a relatively more modern interpreted language such as JAVA.

A recurring issue and challenge with such a hybrid computer program or application resides in the difficulty in the debugging or identifying of errors in the application as it is being written. This is inherent because the debugging of compiled languages requires a relatively significantly different debugging engine technology as compared to the debugging engine technology of interpreted languages. As a consequence of using different underlying debug engines, it is difficult to utilize a common scripting language (e.g., Python) capable of driving both sides of the hybrid application. This occurs because scripting languages are typically tied to the debug engine itself.

SUMMARY

According to one or more embodiments of the present invention, a computer-implemented method includes providing, by a processor, a debug extension library on top of a programming language interpreter; providing, by the processor, a common debug interface as part of the debug extension library; providing, by the processor, at least two common debug interface implementations, a first one of the at least two common debug interface implementations being dedicated to a native debugger of an interpreted language computer program, a second one of the at least two common debug interface implementations being dedicated to a native debugger of a compiled language computer program, wherein an application contains a first portion written in an interpreted programming language and a second portion written in a compiled programming language; and responding, by the processor, to a user command provided through a debug script program to debug the application by commanding one of the native debugger of an interpreted language computer program or the native debugger of a compiled language computer program through the corresponding dedicated common debug interface implementation.

According to another embodiment of the present invention, a system includes a processor in communication with one or more types of memory, the processor configured to provide a debug extension library on top of a programming language interpreter; to provide a common debug interface as part of the debug extension library; to provide at least two common debug interface implementations, a first one of the at least two common debug interface implementations being dedicated to a native debugger of an interpreted language computer program, a second one of the at least two common debug interface implementations being dedicated to a native debugger of a compiled language computer program, wherein an application contains a first portion written in an interpreted programming language and a second portion written in a compiled programming language; and to respond to a user command provided through a debug script program to debug the application by commanding one of the native debugger of an interpreted language computer program or the native debugger of a compiled language computer program through the corresponding dedicated common debug interface implementation.

According to yet another embodiment of the present invention, a computer program product includes a non-transitory storage medium readable by a processing circuit and storing instructions for execution by the processing circuit for performing a method that includes providing a debug extension library on top of a programming language interpreter; providing a common debug interface as part of the debug extension library; providing at least two common debug interface implementations, a first one of the at least two common debug interface implementations being dedicated to a native debugger of an interpreted language computer program, a second one of the at least two common debug interface implementations being dedicated to a native debugger of a compiled language computer program, wherein an application contains a first portion written in an interpreted programming language and a second portion written in a compiled programming language; and responding to a user command provided through a debug script program to debug the application by commanding one of the native debugger of an interpreted language computer program or the native debugger of a compiled language computer program through the corresponding dedicated common debug interface implementation.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
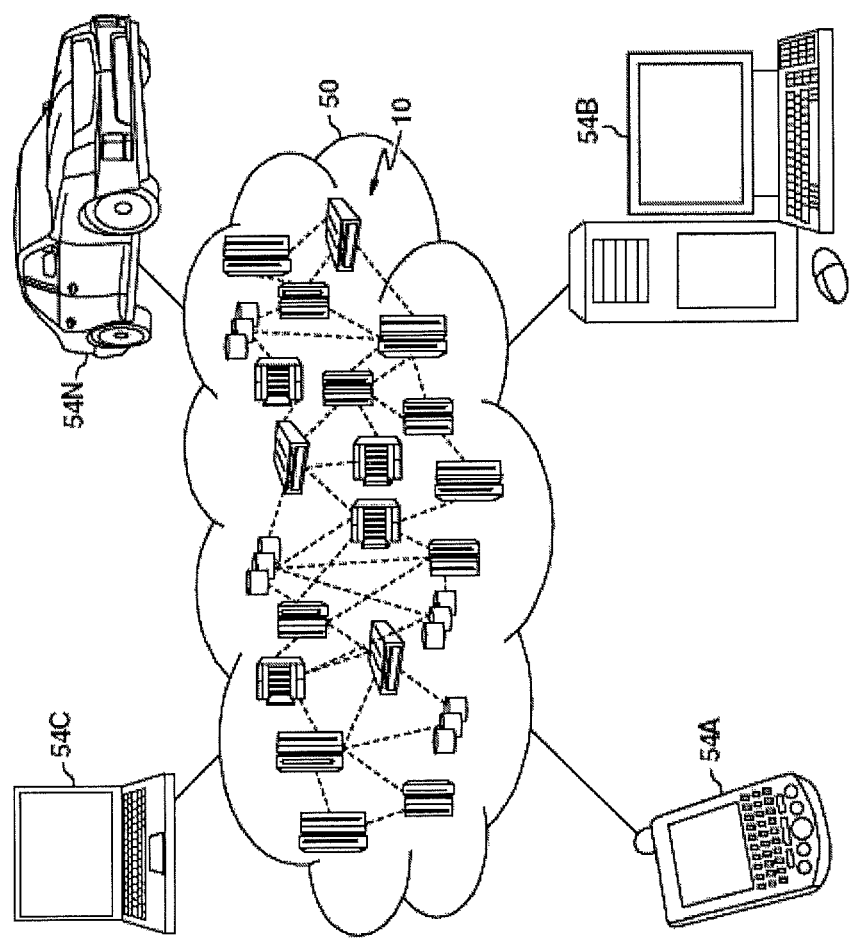
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
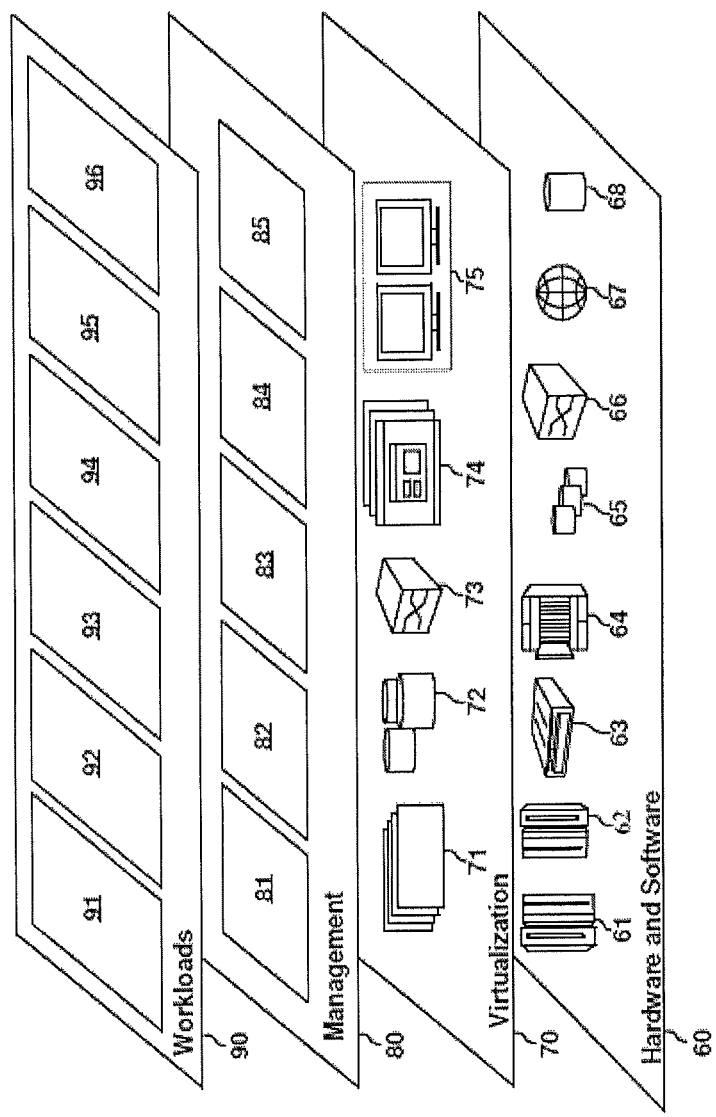
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for providing a common debug scripting framework for driving hybrid software or computer program applications each comprising one or more compiled language computer program components and one or more interpreted language computer program components, in accordance with one or more embodiments of the present invention.

Figure 3:
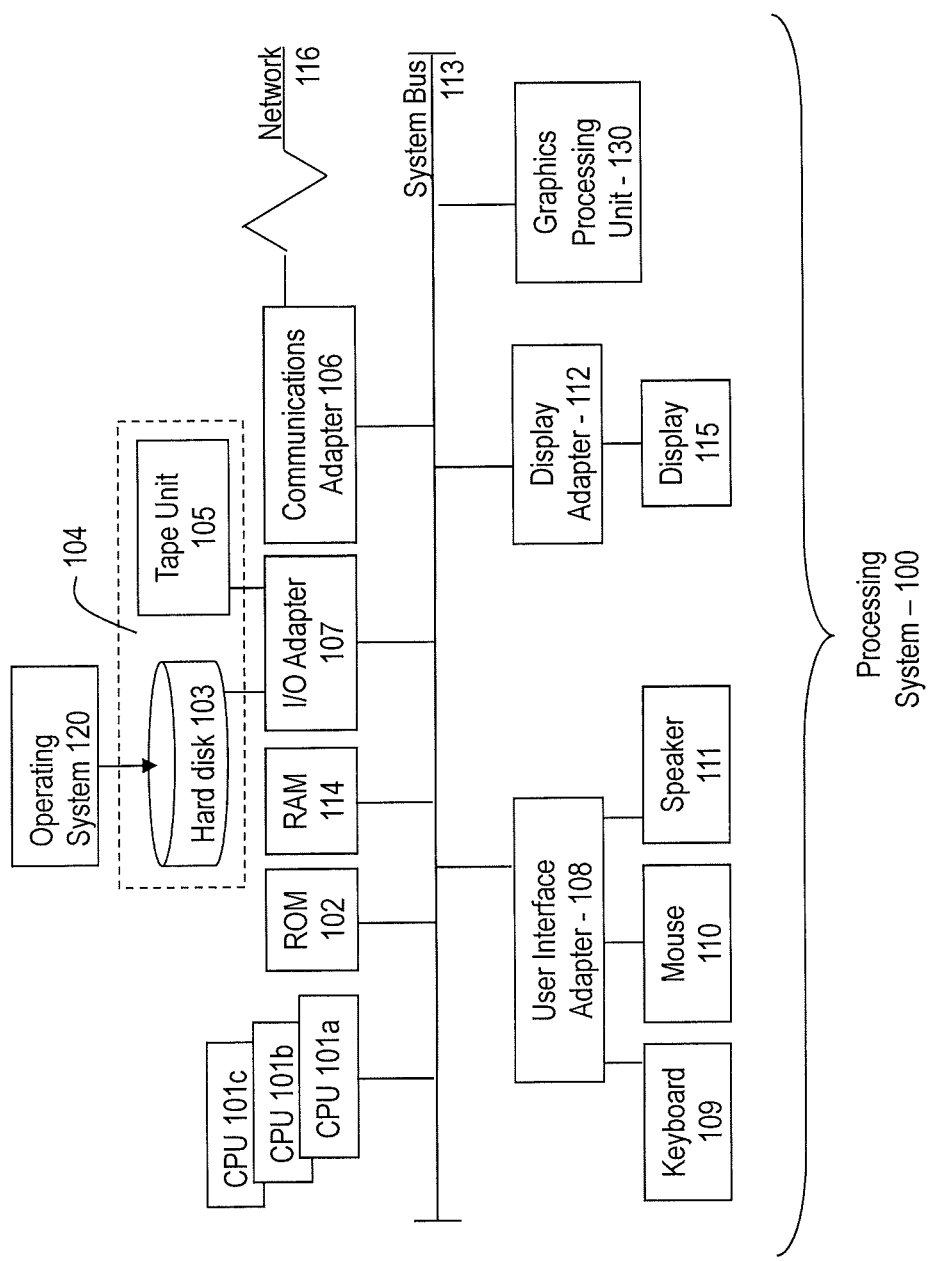
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101).

In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. Hard disk 103 and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed for providing a common debug scripting framework for driving hybrid software or computer program applications each comprising one or more compiled language computer program components and one or more interpreted language computer program components, in accordance with one or more embodiments of the present invention.

Embodiments of the present invention provide for a cross-platform and cross-language or hybrid (i.e., having both compiled languages and interpreted languages) debug scripting environment that allows users to seamlessly write and utilize a single script program (e.g., written in a Python-based scripting language such as Jython) to simultaneously control the runtime behavior or execution flow of both the compiled language and interpreted language native debuggers. The single script program is not tied to any one specific native debugging engine.

Embodiments of the present invention support a common scripting language for hybrid computer program applications through the use of a method and system that extends existing debug technology to provide a common framework for control and analysis across diverse native debug engines running on various platforms and programming languages. This framework enables the use of a single script program (written in a single scripting language) to debug both sides of a hybrid application comprised, for example, of a portion written in a (traditional) compiled language (e.g., C, C++, COBOL, etc.) and another portion written in a (traditional) interpreted language (e.g., Java). Thus, embodiments permit users to quickly compose a new debugger that enables them to debug hybrid applications seamlessly (i.e., steps through transparently across function calls, with call stacks automatically merged).

Figure 4:
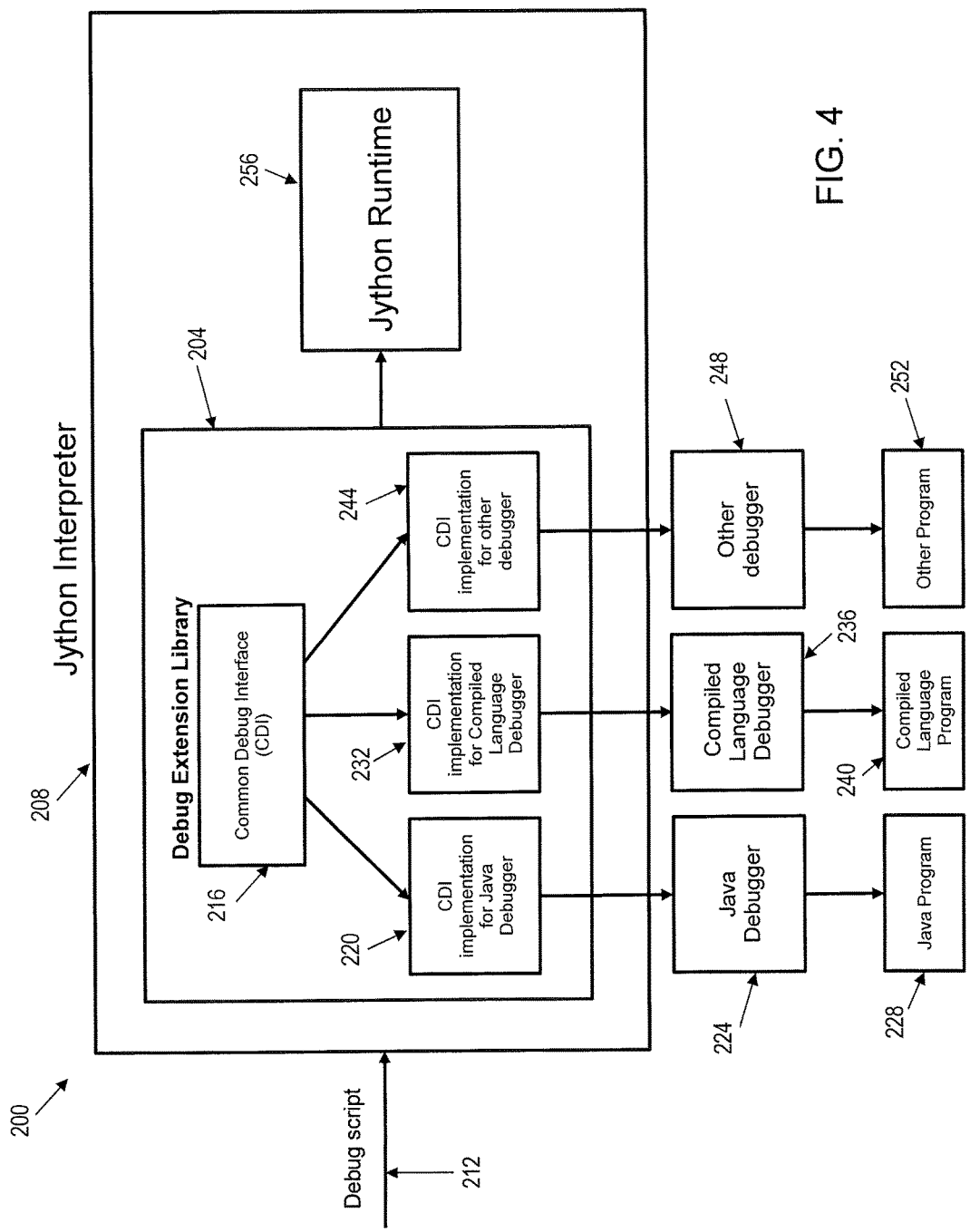
FIG. 4 is a block diagram of a common debug scripting programming language framework that may be utilized with various different programming language type debuggers according to one or more embodiments of the present invention.

Referring to FIG. 4, there illustrated is a block diagram of a common debug scripting programming language framework 200 that may be utilized with various different programming language type debuggers in accordance with embodiments of the present invention. In general, a "scripting" programming language is one that is typically converted into machine code "on the fly" during runtime by an interpreter rather than being compiled by the computer prior to execution. That is, a scripting language is one (e.g., JavaScript) that does not require an explicit compilation step like a traditional compiler program (e.g., C, C++, COBOL) requires prior to execution.

However, there is no current or modern "bright line" test that distinguishes a programming language as being a scripting type of language or not. Instead, whether a programming language is a scripting language or not is oftentimes now determined by how a program created by the programming language is used or the environment that the created program is used in. One example of a scripting language is when a programming language is used to create a program that connects or "glues" together different programming language components. That is the case with embodiments of the present invention in which the native debuggers for different types of programming languages (e.g., compiled and interpreted languages) are connected and utilized together by the common debug scripting programming framework 200 of FIG. 4.

The scripting programming framework 200 of embodiments of the present invention may be implemented in the popular and relatively easy to use Python scripting programming language. More specifically, the scripting framework may be implemented in Jython, which is an implementation of the Python scripting programming language designed to run on the Java interpreted language platform. In general, Jython scripting programs can import and use any Java class, can use all valid Python language constructs, built-in Python functions, and debug-related extension functions (e.g., some may be implemented in Java and others implemented in Python). Also, Jython compiles to Java bytecode or intermediate language either on demand or statically.

However, it is to be understood that implementing various embodiments of the present invention in Python or Jython is purely exemplary. Other scripting (or even non-scripting) programming languages may be utilized in various embodiments in light of the teachings herein.

In FIG. 4, the universal common debug scripting programming language framework 200 may be utilized either in user interface (UI) mode or batch mode. Also, as part of the universal common debug scripting programming language framework 200, a debug extension library 204 is created or built on top of a Jython interpreter 208. This is so that the same script syntax within a debug script program 212 can be used for the various different debuggers encountered as part of the overall application or computer program being developed (i.e., there is no need to modify the debug script program 212 for use with different debuggers). In embodiments of the present invention, the debug script program 212 is created by a user through use of a scripting programming language such as Jython. The various elements of the debug script program 212 are described in greater detail hereinafter with respect to the flow diagrams of FIGS. 5-7.

As part of the debug extension library 204, a common debug interface (CDI) 216 is provided. The purpose of the CDI 216 is to abstract or include various features or capabilities that are common or found in most debuggers whether for compiled languages or for interpreted languages. These common features may include, for example and without limitation, launching, breakpoint, stepping, terminate/resume/suspend, variable inspection, expression evaluation, and stack frame source location. Other features that may be in common between various debuggers may be included as well in the CDI 216.

Also included in the framework 200 is a CDI implementation that is dedicated for each native program debugger utilized. For example, there is a separate CDI implementation 220 for a Java (i.e., an interpreted language) debugger 224 that is part of a JAVA program 228, a separate CDI implementation 232 for a compiled language debugger 236 that is part of a compiled language program 240 (e.g., C, C++, COBOL, etc.), and a separate CDI implementation 244 for an "other" debugger 248 that is part of an "other" program 252. The other program 252 may be another interpreted or compiled program, or some other type of program now known or hereinafter contemplated.

Although not shown explicitly in FIG. 4, various embodiments of the present invention contemplate that the framework 200 may include one or a plurality of interpreted language programs, and one or a plurality of compiled language programs. Each such interpreted and compiled program typically contains its own native debugger. As such, the debug extension library 204 of FIG. 4 would include a separate (i.e., dedicated) CDI implementation 220, 232, 244 for each native debugger 224, 236, 248.

In accordance with embodiments of the present invention, each CDI implementation 220, 232, 244 can drive the debugging of a native program 228, 240, 252 (e.g., as it being written) by controlling operation of the corresponding native debugger 224, 236, 248 that is a part of each computer program 228, 240, 252.

Embodiments of the present invention allow for the relatively easy adaptation of new debuggers into the framework 200. All that is required is that a dedicated CDI implementation be provided for each new debugger that is added into the framework 200, similar to the dedicated CDI implementations 220, 232, 244 shown in FIG. 4.

FIG. 4 also illustrates the Jython runtime module 256 that is the foundation from which the debug extension library 204 is built upon.

In accordance with embodiments of the present invention, the universal common debug scripting programming language framework 200 supports asynchronous debug event handling. Specifically, each CDI implementation 220, 232, 244 may support asynchronous debug event handling. This may be carried out, for example, by calling a handler function when certain debug events occur as an application or computer program is being debugged by a user as the application is being written or after the application has been written. The handler function may be capable of supporting non-sequential program execution flows and user interface applications, and the handler function does not need to anticipate the program flow at the beginning. Exemplary debug event handlers include: (1) a breakpoint handler that is invoked when a given breakpoint is hit. The breakpoint context may be passed to the handler as a parameter; (2) a stop handler that is invoked whenever the program is suspended; and (3) a termination handler that is invoked when the debugged program is terminated.

Embodiments of the present invention allow for the creation of an interactive command line debugger script program 212 that connects to both at least one interpreted language (e.g., Java) debugger 224 and at least one compiled language (e.g., C) debugger 236. Although embodiments of the present invention interact with at least two different debuggers 224, 236, the CDI 216 and individual CDI implementations 220, 232, 244 provide for a seamless interface to integrate the multiple debuggers 224, 236 together, as if only one debugger was being utilized.

One or more of the CDI implementations 220, 232, 244 may prompt the user for command input which starts or continues the overall or specific portion of the debugging process. The prompt may be implemented differently depending on whether the framework is operating in user interface mode or batch mode. Also, the framework 200 may allow the user to control the hybrid or mixed language debug scenario as if the user was working with only one debugger. All user commands may be context aware, and the user can print out the merged stack frames using one command. For the description of the interactive command line debugger script program hereinafter, the hybrid scenario being debugged is assumed to be a Java program making calls to a compiled language program.

Figure 5:
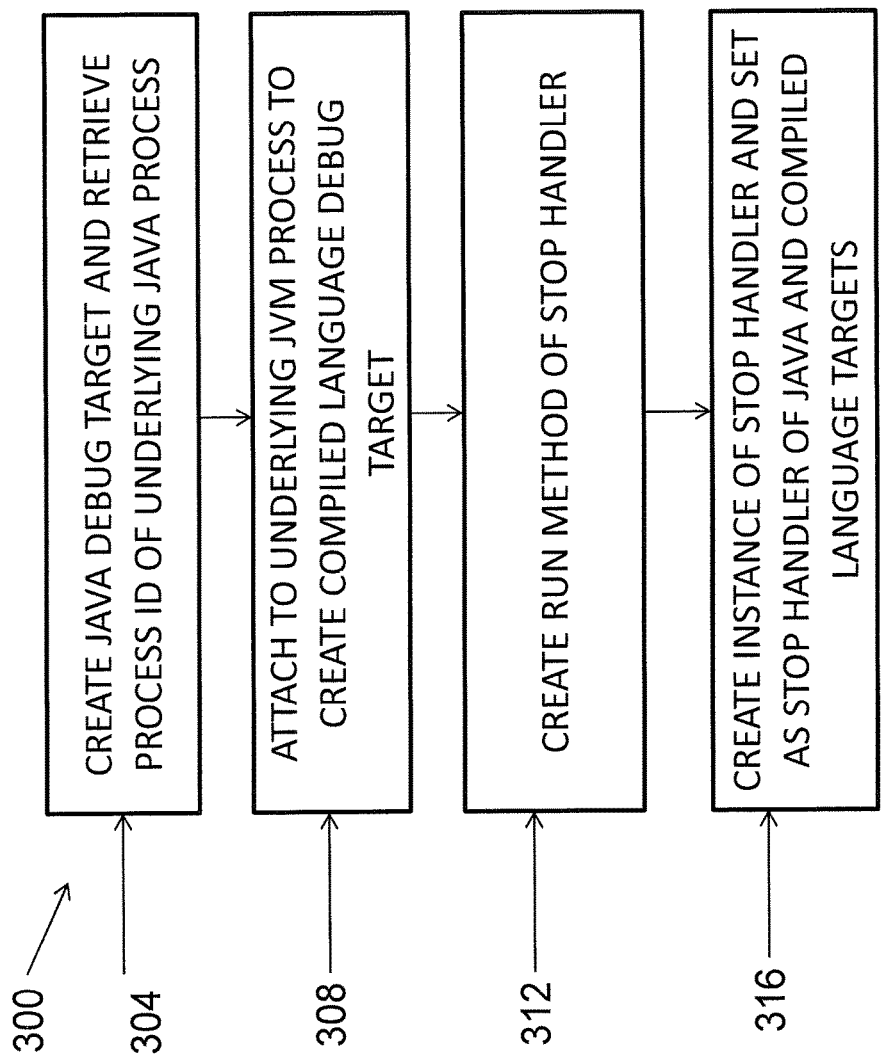
FIG. 5 is a flow diagram of a method comprising a main script portion of an interactive command line debugger script program according to one or more embodiments of the present invention.

Referring to FIG. 5, there illustrated is a flow diagram of a method 300 comprising a main script portion of the interactive command line debugger script program 212 according to one or more embodiments of the present invention.

In the method 300 of FIG. 5, in an operation in block 304 a Java debug target is created and the process id of the underlying Java Virtual Machine (JVM) process is retrieved. Next, in an operation in block 308, the main script creates the compiled language debug target by attaching to the underlying Java Virtual Machine (JVM) process.

In an operation in block 312, the run method of the stop handler is created, where the run method of the stop handler is called whenever the connecting debug target is suspended. Next, in an operation in block 316, an instance of the stop handler is created and is set as the stop handler of the Java and compiled language debug targets.

Figure 6:
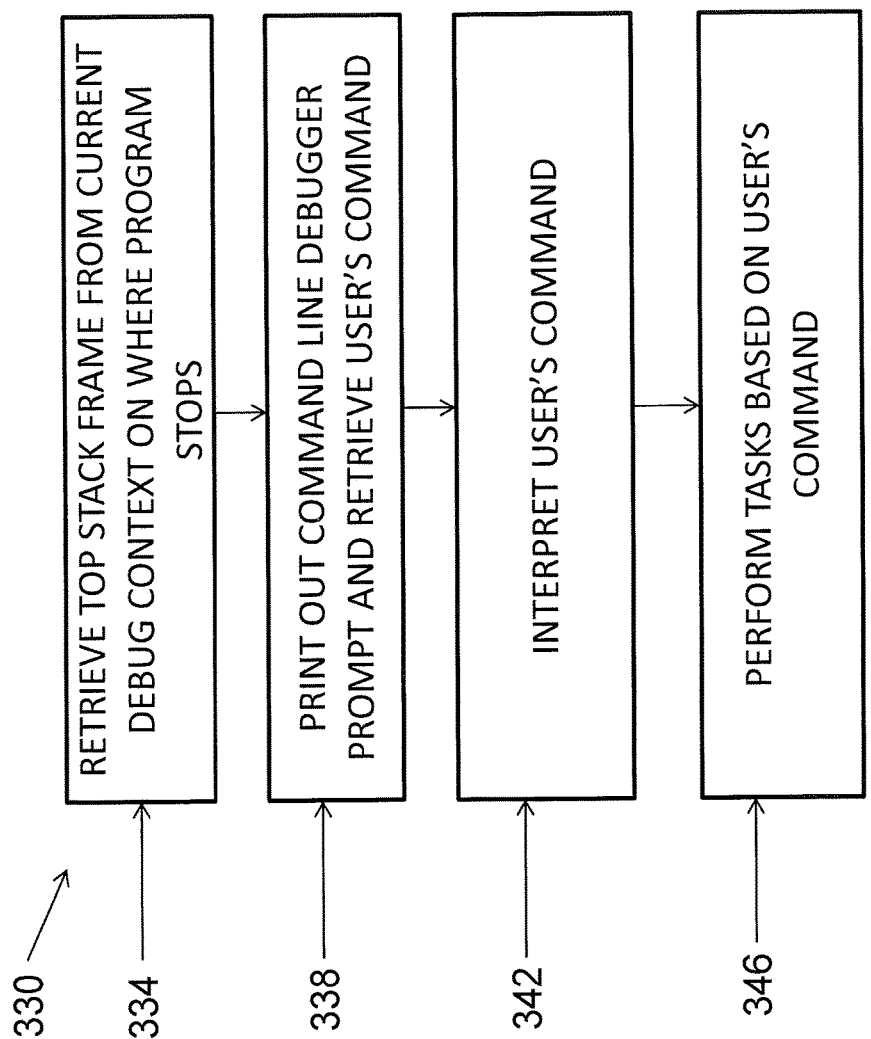
FIG. 6 is a flow diagram of a method comprising a stop handler portion of the main script portion of the interactive command line debugger script program of FIG. 5 according to one or more embodiments of the present invention.

FIG. 6 is a flow diagram of a method 330 comprising a stop handler portion of the main script portion of the interactive command line debugger script program of the method 300 of FIG. 5 according to one or more embodiments of the present invention. Specifically, the stop handler was created in the operation in block 316 in the method 300 of the flow diagram of FIG. 5.

In an operation in block 334, the top stack frame is retrieved from the current debug context on where the program stops. Next, in an operation in block 338, the command line debugger prompt is printed out and the user's command input is retrieved.

In an operation in block 342, the user's command is interpreted. Next, in an operation in block 346, different tasks are performed based on the user's input commands. The supported input commands may include "list", which prints the current line number and source statement; "next", which steps over a source statement; "cont", which resumes the debug session; "stopj at", which sets a Java line breakpoint; "stopc at", which sets a compiled language line breakpoint; "print", which prints out the value of a variable or expression; "quit", which exits from the command line debugger; and "where", which prints out the merged stack frames. The "where" command is described in greater detail hereinafter, to illustrate how a particular command can be implemented in the scripting debug framework.

Figure 7:
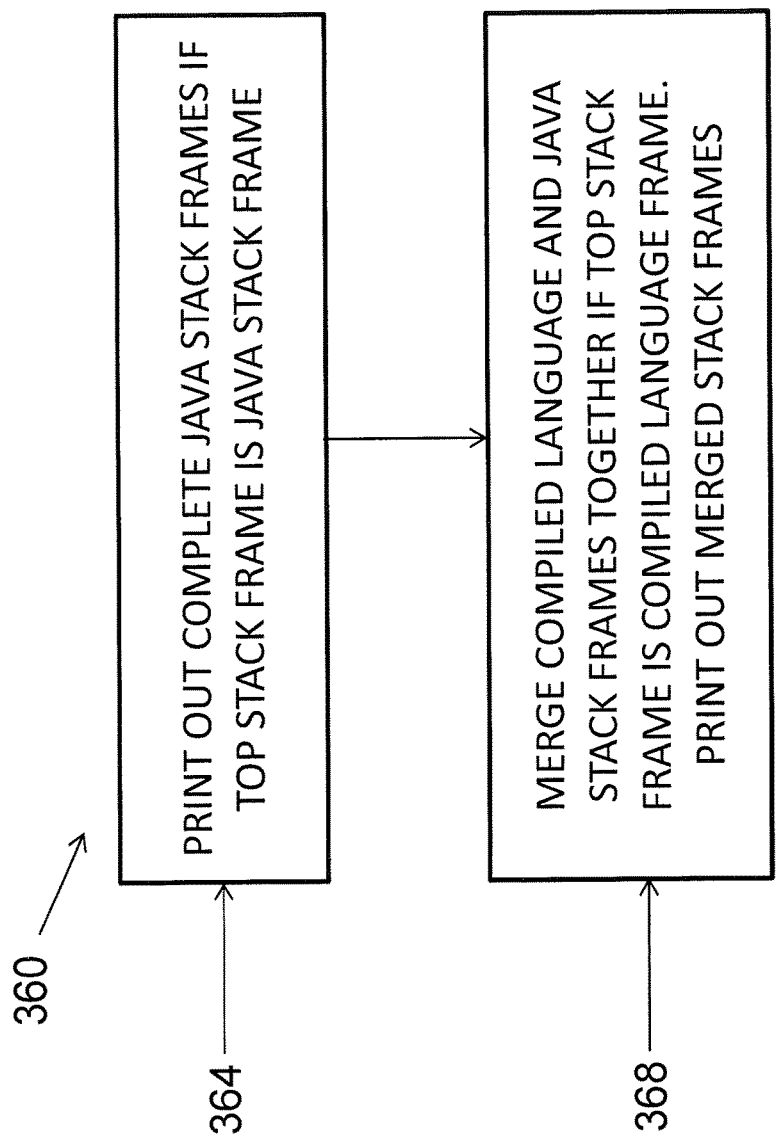
FIG. 7 is a flow diagram of a method comprising a "where" command processing portion of the stop handler portion of the interactive command line debugger script program of FIG. 6 according to one or more embodiments of the present invention.

FIG. 7 is a flow diagram of a method 360 comprising the "where" user command processing portion of the stop handler portion of the interactive command line debugger script program in the methods 300, 330 of FIGS. 5 and 6 according to one or more embodiments of the present invention.

In the example hybrid scenario, a Java program calls one or more compiled language programs. If the top stack frame is a Java stack frame, there would not be any compiled language stack frames in the call stack. However, if the top stack frame is a compiled language stack frame, then we have already entered one of the compiled programs. In an operation in block 364, the complete Java stack frames are printed out if the top stack frame is a Java stack frame. Next, in operation in block 368, if the top stack frame is a compiled language stack frame, the compiled language stack frames and the Java stack frames are merged together and printed out. When merging the compiled language stack frames, the user may only include the debuggable ones at the stop and ignore the JVM runtime stack frames at the bottom.

In one or more embodiments of the present invention, the framework 200 of FIG. 4 and the method 300 of FIGS. 5-7 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 100 described hereinabove and illustrated in FIG. 3, or in some other type of computing or processing environment.

Various features of embodiments of the present invention include a common debug interface being used to abstract the common debugger capabilities of different native debuggers. Also, embodiments support the debugging of a programming language by implementing a relatively simple or "light-weight" debug wrapper or script program that conforms to the common debug interface adapter which "sits" on top of the native language debugger. This way the existing native language debuggers are leveraged to perform debug operations on each native programming language.

Embodiments also utilize a single script to control operations of multiple heterogeneous debuggers. That is, the same script syntax is employed for debug operations over different debugger implementations. Embodiments also allow a user to create customized runtime analysis tools based on a script driven automated debug back end. In addition, embodiments of the present invention provide for a script driven framework which automates the debugging operations of hybrid applications without the need for user intervention or a user interface, in contrast to prior art hybrid application debuggers.

Further, embodiments of the present invention apply to any hybrid or "mixed-language" debug scenario, and not just for applications built on top of a virtual machine. Also, for those embodiments that utilize a virtual machine, no information about the virtual machine need be known to implement embodiments of the present invention.

In addition, embodiments of the present invention do not contain any restrictions on how the user application is written. Instead, embodiments may debug any hybrid application regardless of the programming frameworks and calling conventions. It suffices that there exists a native debugger for each different programming language in the computer program or application being utilized with embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   providing, by a processor, a debug extension library on top of a programming language interpreter;
   providing, by the processor, a common debug interface as part of the debug extension library;
   providing, by the processor, at least two debug interface implementations as part of the common debug interface, a first one of the at least two debug interface implementations being dedicated to a native debugger of an interpreted language computer program and a second one of the at least two debug interface implementations being dedicated to a native debugger of a compiled language computer program, wherein an application contains a first portion written in an interpreted programming language and a second portion written in a compiled programming language; and
   responding, by the processor, to a user command provided through a debug script program to debug the application by commanding one of the native debugger of an interpreted language computer program or the native debugger of a compiled language computer program through the corresponding dedicated debug interface implementation, wherein the debug script program is a single script program,
   wherein the common debug interface contains a plurality of features abstracted from the native debugger of the interpreted language computer program and from the native debugger of the compiled language computer program, and wherein the plurality of abstracted features are common to both the native debugger of the interpreted language computer program and from the native debugger of the compiled language computer program, the plurality of abstracted common features include launching, breakpoint, stepping, terminate/resume/suspend, variable inspection, expression evaluation, and stack frame source location.

2. The computer-implemented method of claim 1 wherein the interpreted language computer program comprises Java.

3. The computer-implemented method of claim 1 wherein the compiled language computer program comprises one of C, C++ or COBOL.

4. The computer-implemented method of claim 1 wherein when a predetermined debug event occurs, one of the at least two debug interface implementations calls a handler function.

5. A system comprising:
   a processor in communication with one or more types of memory, the processor configured to:
     provide a debug extension library on top of a programming language interpreter;
     provide a common debug interface as part of the debug extension library;
     provide at least two debug interface implementations as part of the common debug interface, a first one of the at least two debug interface implementations being dedicated to a native debugger of an interpreted language computer program and a second one of the at least two debug interface implementations being dedicated to a native debugger of a compiled language computer program, wherein an application contains a first portion written in an interpreted programming language and a second portion written in a compiled programming language; and
     respond to a user command provided through a debug script program to debug the application by commanding one of the native debugger of an interpreted language computer program or the native debugger of a compiled language computer program through the corresponding dedicated debug interface implementation, wherein the debug script program is a single script program,
     wherein the common debug interface contains a plurality of features abstracted from the native debugger of the interpreted language computer program and from the native debugger of the compiled language computer program, and wherein the plurality of abstracted features are common to both the native debugger of the interpreted language computer program and from the native debugger of the compiled language computer program, the plurality of abstracted common features include launching, breakpoint, stepping, terminate/resume/suspend, variable inspection, expression evaluation, and stack frame source location.

6. The system of claim 5 wherein the interpreted language computer program comprises Java.

7. The system of claim 5 wherein the compiled language computer program comprises one of C, C++ or COBOL.

8. The system of claim 5 wherein when a predetermined debug event occurs, one of the at least two debug interface implementations calls a handler function.

9. A computer program product comprising:
a non-transitory storage medium readable by a processing circuit and storing instructions for execution by the processing circuit for performing a method comprising:
providing a debug extension library on top of a programming language interpreter;
providing a common debug interface as part of the debug extension library;
providing at least two debug interface implementations as part of the common debug interface, a first one of the at least two debug interface implementations being dedicated to a native debugger of an interpreted language computer program and a second one of the at least two debug interface implementations being dedicated to a native debugger of a compiled language computer program, wherein an application contains a first portion written in an interpreted programming language and a second portion written in a compiled programming language; and
responding to a user command provided through a debug script program to debug the application by commanding one of the native debugger of an interpreted language computer program or the native debugger of a compiled language computer program through the corresponding dedicated debug interface implementation, wherein the debug script program is a single script program,
wherein the common debug interface contains a plurality of features abstracted from the native debugger of the interpreted language computer program and from the native debugger of the compiled language computer program, and wherein the plurality of abstracted features are common to both the native debugger of the interpreted language computer program and from the native debugger of the compiled language computer program, the plurality of abstracted common features include launching, breakpoint, stepping, terminate/resume/suspend, variable inspection, expression evaluation, and stack frame source location.

10. The computer program product of claim 9 wherein the interpreted language computer program comprises Java, and wherein the compiled language computer program comprises one of C, C++ or COBOL.

11. The computer program product of claim 9 wherein when a predetermined debug event occurs, one of the at least two debug interface implementations calls a handler function.

* * * * *